US007266112B1

(12) United States Patent
Law et al.

(10) Patent No.: US 7,266,112 B1
(45) Date of Patent: Sep. 4, 2007

(54) DIAL ACCESS STACK ARCHITECTURE

(75) Inventors: Bassanio Law, Fremont, CA (US); Shamim Shariffudin Pirzada, Milpitas, CA (US); Shaji Ravindra Nathan, Sunnyvale, CA (US)

(73) Assignee: Cisco Technology, Inc, San Jose, CA (US)

( * ) Notice: Subject to any disclaimer, the term of this patent is extended or adjusted under 35 U.S.C. 154(b) by 1185 days.

(21) Appl. No.: 10/056,102

(22) Filed: Jan. 23, 2002

Related U.S. Application Data

(63) Continuation of application No. 09/107,187, filed on Jun. 29, 1998, now Pat. No. 6,373,838.

(51) Int. Cl.
*H04L 12/46* (2006.01)
*H04L 12/66* (2006.01)
*G06F 15/16* (2006.01)

(52) U.S. Cl. .................. 370/352; 370/401; 370/474; 379/88.17; 379/93.07; 709/203; 709/218; 709/225; 709/249

(58) Field of Classification Search ................. 370/352, 370/401, 474; 379/88.17, 93.07; 709/203, 709/218, 225, 249
See application file for complete search history.

(56) References Cited

U.S. PATENT DOCUMENTS

| | | | | |
|---|---|---|---|---|
| 5,406,557 A | * | 4/1995 | Baudoin | 370/61 |
| 5,537,533 A | * | 7/1996 | Staheli et al. | 714/5 |
| 5,550,802 A | * | 8/1996 | Worsley et al. | 370/252 |
| 5,933,490 A | * | 8/1999 | White et al. | 379/221.01 |
| 6,065,061 A | * | 5/2000 | Blahut et al. | 709/239 |
| 6,073,176 A | * | 6/2000 | Baindur et al. | 709/227 |
| 6,084,892 A | * | 7/2000 | Benash et al. | 370/401 |
| 6,097,719 A | * | 8/2000 | Benash et al. | 370/352 |
| 6,160,819 A | * | 12/2000 | Partridge et al. | 370/474 |
| 6,594,776 B1 | * | 7/2003 | Karighattam et al. | 714/4 |
| 6,650,631 B1 | * | 11/2003 | Benash et al. | 370/352 |

OTHER PUBLICATIONS

Product overview of "Cisco AccessPath-UGS4—Carrier-Class Integrated Universal Gateway", Copyright 1992-2001 Cisco Systems, Inc., pp. 1-5.
Product overview of "Cisco AccessPath-TS3—Carrier-Class Integrated Access System", Copyright 1992-2002 Cisco Systems, Inc., pp. 1-10.

* cited by examiner

*Primary Examiner*—Alpus H. Hsu
(74) *Attorney, Agent, or Firm*—Marger Johnson & McCollom PC

(57) ABSTRACT

A Dial Access Stack Architecture (DASA) includes a stack of Network Access Servers (NASs) each independently establishing and processing information for communication links on a public telephone network. A primary interconnect couples the stack of network access servers together through a primary network. A routing engine is coupled through the primary interconnect to the stack of network access servers routing packets between the network access servers and an Internet network. A secondary interconnect couples the stack of network access servers together through a secondary network that operates independently of the primary interconnect. The primary or secondary interconnects each allow pairs of the network access servers to communicate with each other in parallel and independently of the routing engine. The DASA provides scalability and resiliency to fault conditions and can easily aggregate and integrate any new access media. Applications such as voice, video and multicasting can be seamlessly added. The DASA architecture can scale from hundreds to thousands of ports at optimal cost and performance while avoiding any single point of failure.

27 Claims, 5 Drawing Sheets

PRIMARY AND SECONDARY INTERCONNECT

ROUTING ENGINES

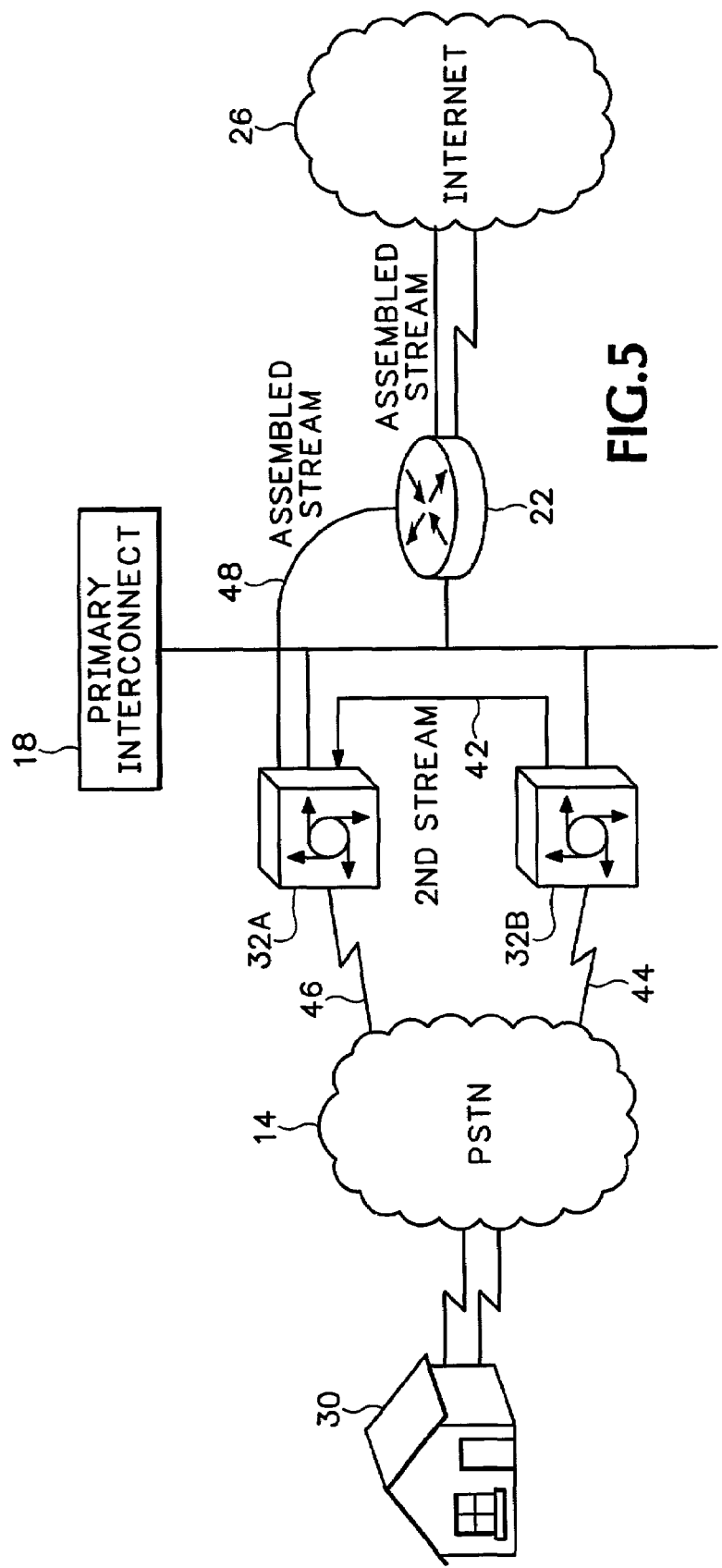

DIAL ACCESS STACK ARCHITECTURE

This application is continuation of prior U.S. Ser. No. 09/107,187, filed Jun. 29, 1998 now U.S. Pat. No. 6,373,838.

BACKGROUND OF THE INVENTION

This invention relates to network access servers and more particularly to a novel dial access stack architecture.

A Network Access Server (NAS) is used for processing multiple fax, analog modem, digital data or other types of calls sent over a Public Service Telephone Network (PSTN) or any other type of communication system. The NAS includes T1, E1, T3 and/or E3 line interfaces that send and receive information over the PSTN. Controllers, framers and modem modules in the NAS convert channel data from the line interface units into digital packets. The packets are sent from the modems over a backplane to router circuitry in the NAS that sends the packets out a packet based network over a LAN or WAN port.

As Internet traffic increases, there is a need to increase the number of communication channels that the NAS can handle at the same time. The prior solution for increasing NAS call processing capacity was to simply increase the number of line interface units, framers and modem modules in the NAS chassis. However, NAS capacity is limited to the physical number of modules that can be supported in one NAS box. Processing capacity is also limited by the bandwidth of the buses used in a NAS backplane for sending data between the different NAS processing modules. Thus current NASs have limited scalability and can only process information from a limited number of communication channels.

The individual line interface units and other processing modules typically communicate to each other using a proprietary communication protocol. A NAS therefore cannot be easily upgraded or interchanged with modules used in other NAS architectures or incorporating different processing technology. All processing modules must also be compatible with the physical board sizes and interfaces used for connecting the modules to a NAS backplane. These restrictions also make it difficult to upgrade NASs or increase the communication links the NAS can process.

Current NAS architectures provide little or no fault tolerance against failures that occur in the field. Upon encountering a failure, field service engineers typically swap out the entire NAS box. For example, when a single modem module in the NAS fails, the entire NAS box is turned off and the modem card replaced. When the NAS is shut down, every call coming into the NAS is disrupted. Because the NAS handles a large number of calls at the same time, any failure, no matter how small, disrupts a large number of telephone calls.

Some NAS architectures break the NAS system into many very small subsystem cards. When a failure occurs, the whole subsystem card is decommissioned and manually swapped by an operator with a standby subsystem card at a later time. Even if a subsystem is partially operational, it is fully decommissioned if a failure is detected. To reduce the effects of failures, redundant cards are placed in the NAS chassis. However, the redundant cards take up space in the NAS chassis and require additional power and interconnectivity that further reduce NAS scalability.

Accordingly, a need remains for a network access server architecture that is more scalable and more easily upgradeable while at the same time being more fault tolerant.

SUMMARY OF THE INVENTION

The Dial Access Stacking Architecture (DASA) provides scalability and resiliency to fault conditions and can easily aggregate and integrate new access media. Applications such as voice, video and multicasting can be seamlessly added. The DASA architecture can scale from hundreds to thousands of ports to optimize performance. System redundancy avoids any single point of failure.

The DASA includes a stack of network access servers each independently processing information for communication links established over a public telephone network. A primary interconnect couples the stack of network access servers together through a primary network. A routing engine is coupled through the primary interconnect to the stack of network access servers. The network access servers, primary interconnect and the routing engine, in one embodiment, are all independently operating stand alone systems. The primary interconnect comprises a packet-based network switch that allows pairs of the network access servers to communicate with each other in parallel while one of the other network access servers transfers information to the routing engine. It also provides an adequate buffer to hold packets for automatic re-transmission when the recipient is busy. As such the transmitting entity (network access server or routing engine) never has to wait. This in turn reduces the probability that the connected entities are busy. A secondary interconnect couples the stack of network access servers together through a secondary network that operates independently of the primary network.

A system controller is used to monitor, configure and debug the other DASA components. The system controller independently accesses the stack of network access servers through the primary and secondary interconnect. A serial bus is also coupled between the network access stack and the system controller for system debugging.

The DASA is used with a Stack Group Bidding Protocol (SGBP) to implement a large multi-link dial pool that is multiple times larger than a single NAS can support. Members of a stack group are established from the multiple network access servers. Multiple communication links from one site are then established to the stack group members that operate together as a multilink bundle. The stack group members upon establishing the communication links send bid requests for mastership of the multilink bundle. One of the stack group members making a highest bid is assigned as a bundle master. The communication links in the bundle are sent to the bundle master through the primary or secondary interconnect and the multilink session is conducted with the bundle master through the interconnect independently of the router. This reduces bottlenecks that could occur in architectures where all communications are required to go through the router or a central processing unit.

Unlike proprietary scaling solutions that use customized hardware, DASA has no theoretical constraint on scaling. The only limiting factor is the processing power of each component. The DASA allows integration with a wide selection of readily available commercial components. Thus, as technology advances and more powerful or lower cost components become available, the new components can be easily integrated into the DASA system.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

FIG. 5 is a block diagram showing how the DASA is used in a multilink point to point protocol session.

DETAILED DESCRIPTION

Figure 1:
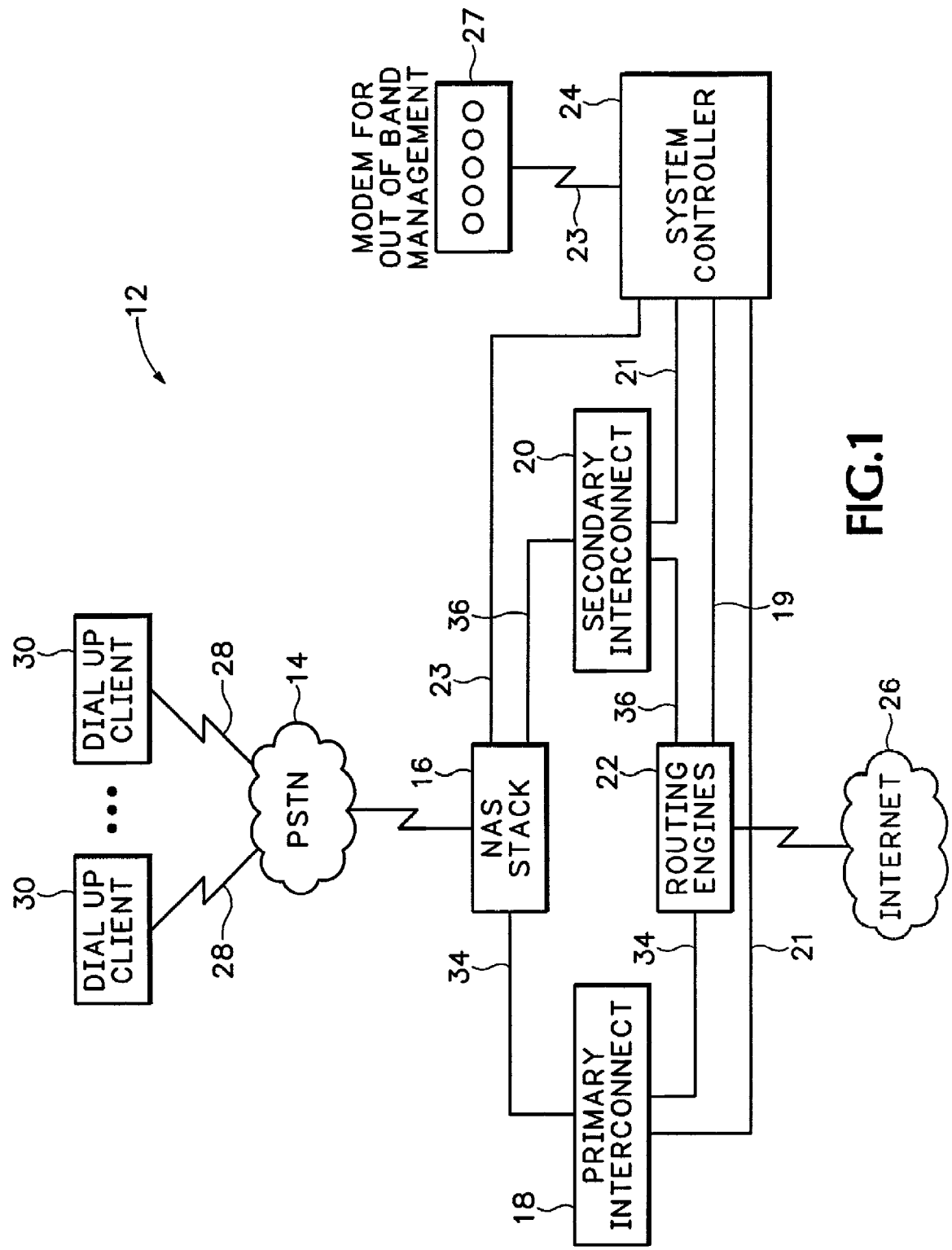
FIG. 1 is a block diagram of a Dial Access Stack Architecture (DASA) according to the invention.

Referring to FIG. 1, a DASA 12 comprises five major components or sub-systems. A Network Access Server (NAS) stack 16 is connected to a Public Service Telephone Network (PSTN) 14. A primary interconnect 18 and a secondary interconnect 20 are each coupled between the NAS stack 16 and routing engines 22. The routing engines 22 are coupled to Internet 26. A system controller 24 is connected directly to the NAS stack 16 through a serial interconnect 23 and indirectly to the NAS stack 16 through interconnects 21 connected to primary interconnect 18 and secondary interconnect 20. An interconnect 19 is connected from the system controller 24 to routing engines 22.

It should be understood that the DASA 12 can be used in any multiservice application. For example, the stack 16 can receive communication links via cable modems, XDSL, PSTN, frame relay or any other type of communication system. For clarity, the invention is described in relation to PSTN but is not limited in scope only to PSTN networks. The scope of the invention covers a DASA that concentrates multiple access points for any system.

The NAS stack 16 aggregates analog and digital calls on dial links 28 established over the PSTN 14 from dial up clients 30. Packet streams extracted from the dial up client calls are switched between individual network access servers and the routing engines 22 by the primary interconnect 18. In the event of a failure in the primary interconnect 18, traffic is switched between DASA components using the secondary interconnect 20. The converse is true for packet traffic from Internet 26 to the dial up clients 30. The packets coming from Internet 26 are switched from the routing engines 22 to the NAS stack 16 across the primary interconnect 18. In the event of a failure in the primary interconnect 18, secondary interconnect 20 is used.

The system controller 24 manages and monitors the components in DASA stack 12 and also serves as the primary Network Timer Protocol (NTP) clock source for the members of the DASA stack 12. A modem 27 is used to send management data extracted from the DASA components to a central network manager (not shown). The system controller 24 is used for out of band access to all DASA components. The system controller features a triple redundant path to each component: primary interconnect, secondary interconnect, serial connection.

All the components used in the DASA 12 are commercially available from Cisco Systems, Inc. 170 West Tasman Drive, San Jose, Calif. 95134-1706 or from other manufactures. In one implementation, the network access servers in NAS stack 16 are Cisco Model No. AS5300 network access systems that each support multiple PRI (T1/E1) lines 28, a 100BaseT full duplex Ethernet 34 and a 10BaseT Ethernet 36. The primary interconnect 18 is a Cisco Catalyst Model No. 5002 100BaseT Ethernet switch and the secondary interconnect 20 is a Cisco Model No. 7206 10BaseT Ethernet switch. The routing engines 22 are Cisco Model No. 7206 or 3640 routers. The system controller 24 is a Cisco Model No. AS3640 router. The system controller 24 and the routing engines 22 can also be collapsed into one Cisco AS3640 router with extra ports for console management.

It should be understood, however, that the DASA 12 could incorporate different components from different network system manufacturers. For example, the NASs in NAS stack 16, the switches in the primary and secondary interconnects 18 and 20, the routers in routing engines 22 and the system controller 24 are all interchangeable with any other system that can perform similar functions. This is because industrial standardized interfaces and protocols are used between all of the different DASA components.

The DASA 12 has no commercial limits on stacking size. The routing engines 22 can incorporate new router technology that operates at least at the speed of the internet 26. Thus, the routing engines will never create a bottleneck for transferring information over the internet.

The interconnects 18 and 20 can also be upgraded with new network switches with more ports. Alternatively, two or more switches can be connected together to increase the total number of ports available for connecting NAS's together. The hierarchy of interconnects can vary for different DASA arrangements. For example, one interconnect can be used to connect two other interconnects to the routing engines 22. The first interconnect that connects the other two interconnects together should be able to operate at a higher data rate to prevent bottlenecks between the other two interconnects and the router.

Figure 2:
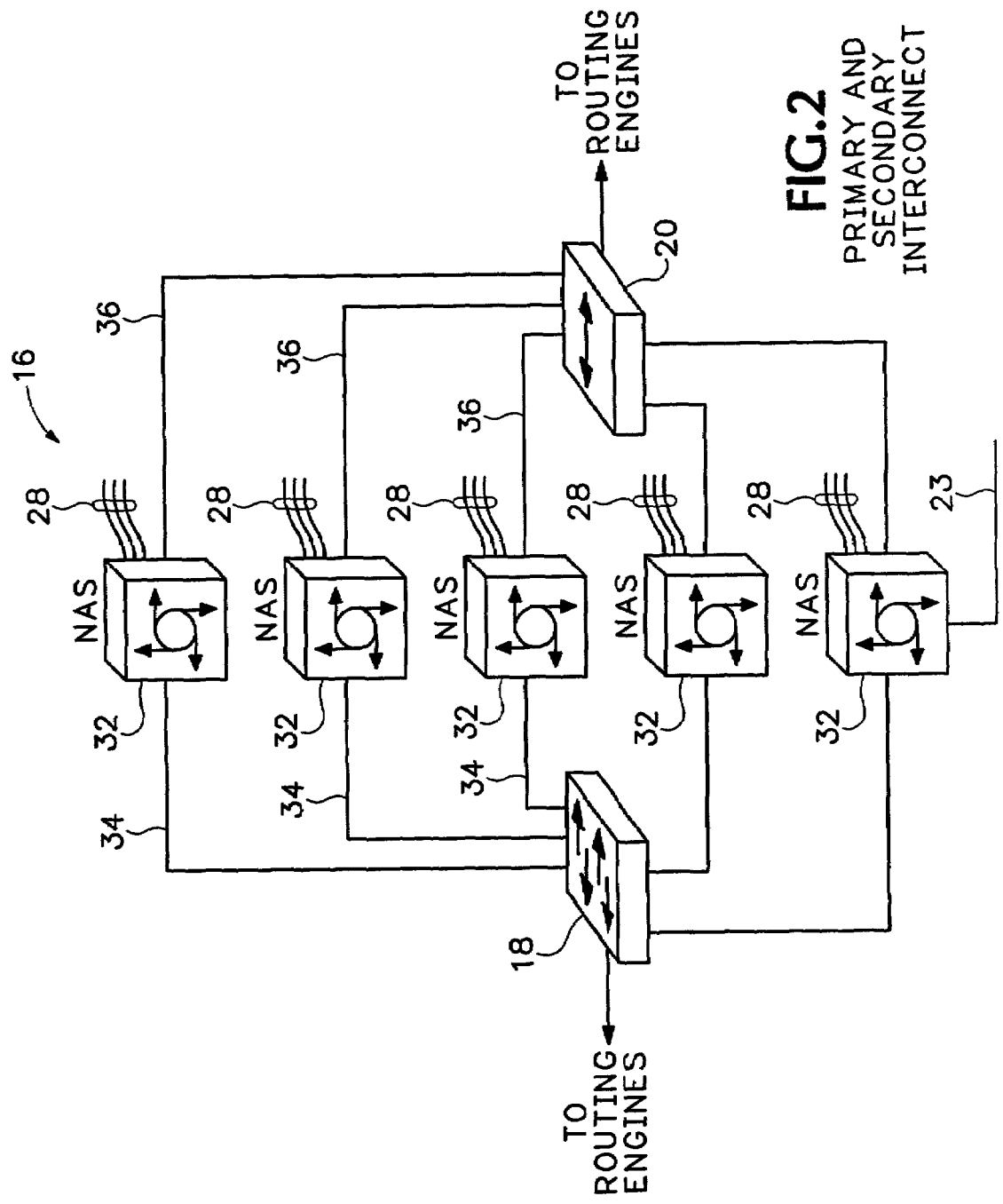
FIG. 2 is a detailed block diagram of a Network Access Server (NAS) stack used in the DASA shown in FIG. 1.

Referring to FIG. 2, the NAS stack 16 comprises banks of NASs 32 organized into a coherent sub-system. Each NAS 32 has multiple Wide Area Network (WAN) dial links 28 and ports for two LANs 34 and 36. The LAN 34 is tied from the NASs 32 to the primary interconnect 18, while LAN 36 is tied from the NASs 32 to the secondary interconnect 20.

The NASs 32 each include a console port that connects through a serial interconnect 23 to system controller 24 (FIG. 1). In one embodiment, the console port is a serial RS232 port used by the system controller 24 to configure the NAS stack 16 or as an emergency link for remote diagnostic and trouble shooting. The NASs 32 may also have additional ports to provide more redundancy, load sharing, or special signaling segregation. The NAS ingress ports connected to dial links 28 are typically implemented as a telephone company trunk such as PRI, BRI, or xDSL. Primary Rate Interface (PRI), Basic Rate Interface (BRI), Digital Subscribe Loop (XDSL) There are many types of DSL, xDSL means the general class of DSL. Another implementation uses a cable modem. The NASs 32 can also be implemented using multiple physical entities. For example, the NASs 32 can comprise a standard router joined to a xDSL concentrator via an ATM link.

As NASs 32 are added in the stack 16 to increase dial port density, the relative processing power available for each dial link 28 stays constant. For multi-link applications, such as those using a Stack Group Bidding Protocol (SGBP) as described below in FIG. 5, processing incurs minor overhead. If other components in DASA 12, such as the primary interconnect 18, secondary interconnect 20 and routing engines 22 are scaleable enough, there are no practical limits to the stack size and the number of dial links 28 that can be supported by NAS stack 16.

The primary and secondary interconnects 18 and 20 typically comprise network switches that interconnect the NASs 32 and routing engines 22 together. The primary interconnect 18 is the primary data path between the components in DASA system 12. The secondary interconnect 20 provides redundancy in the event of a failure in primary interconnect 18. The backup path established by secondary interconnect 20 is configured for automatic and fast convergence with negligible service disruption if the primary path established by primary interconnect 18 fails. The secondary interconnect is optional and can be omitted if redundancy is not an important factor in the system.

Figure 3:
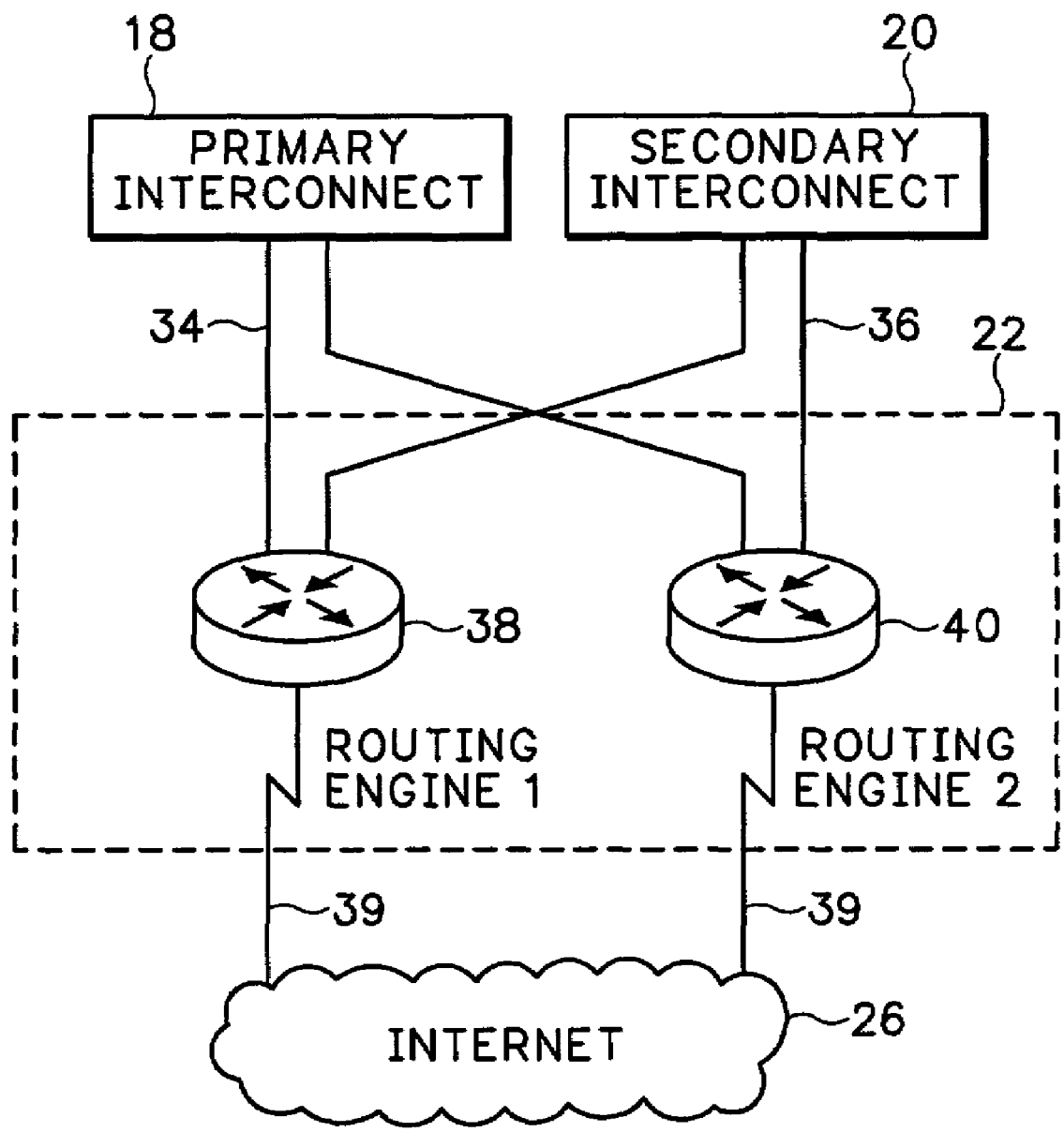
FIG. 3 is a detailed block diagram of routing engines used in the DASA shown in FIG. 1.

Referring to FIG. 3, any router can be used for the routing engines 22. For redundancy and load balancing, 2 routing engines 38 and 40 are used to back up each other in case of a failure. The routing engines 38 and 40 are each coupled to both the primary interconnect 18 and the secondary interconnect 20. If the primary routing engine 38 fails, routing engine 40 is automatically activated to support either the primary interconnect 18 or the secondary interconnect 20 for transferring packets between the NAS stack 16 and Internet 26. The routing engines 38 and 40 include multiple egress ports for establishing networks 34 and 36. A port establishes connection 39 to Internet 26. The egress ports are typically implemented in high speed LAN or WAN interfaces such as 100BaseT, ATM or Optical Fiber.

Figure 4:
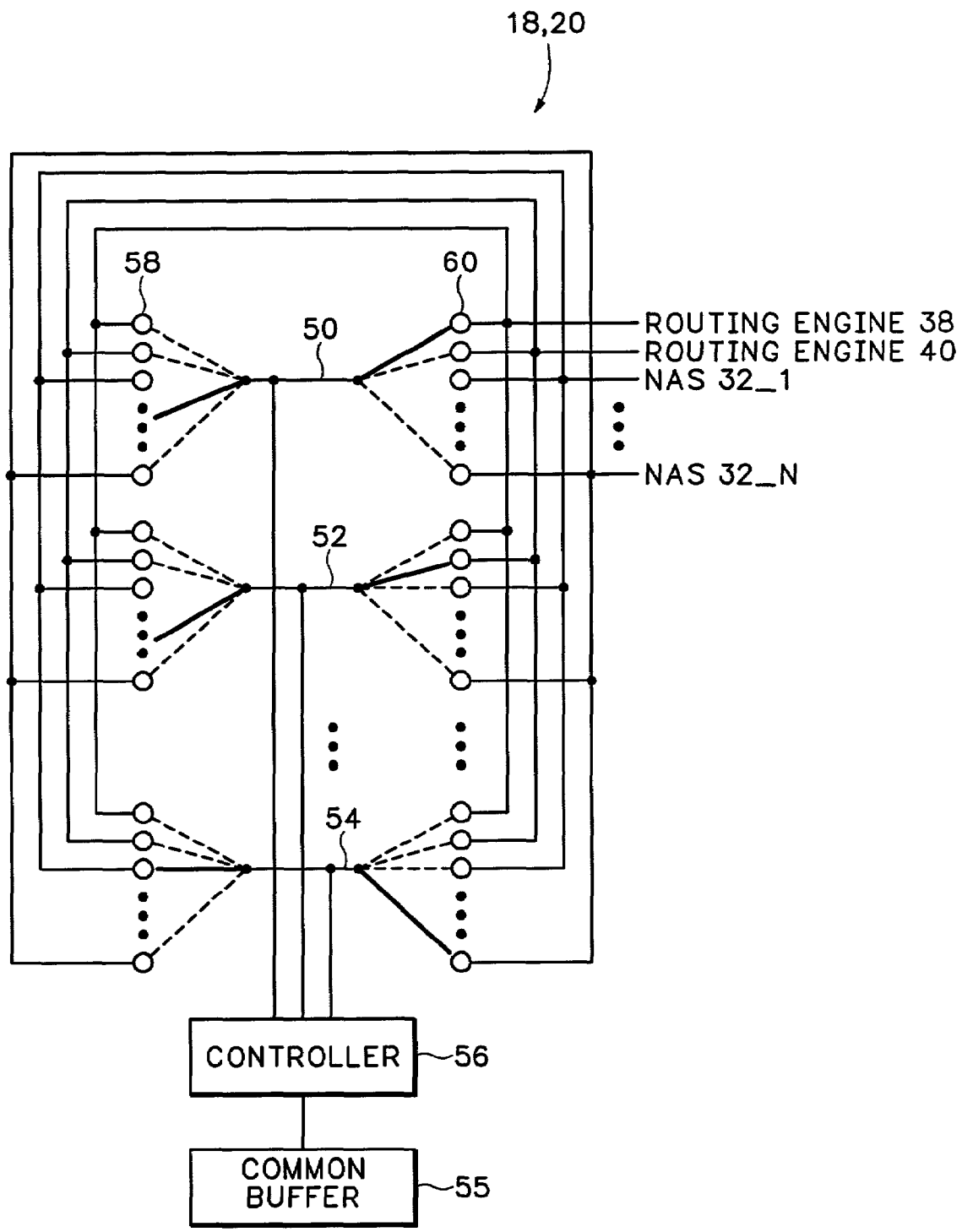
FIG. 4 is a detailed logic diagram showing how a primary or secondary interconnect are used in the DASA shown in FIG. 1.

FIG. 4 is a detailed logic diagram showing how the primary and secondary interconnects 18 and 20 operate. The primary and secondary interconnects 18 and 20 each consist of many high speed ports compatible with the interfaces of other components in DASA 12. For optimal performance, the interconnects 18 and 20 support simultaneous non-blocking data transfer of all the interconnections through a network switch that includes switching circuits 50, 52 and 54. There are many switching circuits in both the primary and secondary interconnects 18 and 20. For clarity, only three switching circuits are shown in FIG. 4. The switching circuits 50, 52 and 54 are each interconnected to each one of the components in the DASA 12 at opposite ends 58 and 60. A controller 56 configures any one of the switches 50, 52 and 54 to connect one of the DASA components at one end 58 to another DASA component at the opposite end 60.

A common buffer 55 is connected to controller 56. The common buffer 55 temporarily stores packets sent to NAS's that are currently busy. Thus, one NAS 32 can continue to send packets for later processing by the busy NAS 32. The common buffer 55 therefore reduces bottlenecks and delays that could occur when sending data between NAS's 32.

The interconnects 18 and 20 allow different NASs 32 and routing engines 38 and 40 to connect to each other and transfer information in parallel. For example, a first and second NAS can transfer information between each other at the same time that a third and fourth NAS 32 are transferring information with each other and a fifth NAS 32 is transferring information with one of the routers 38 or 40. This is a significant improvement over previous NAS implementations that require all data traffic to go through the router or a central processing entity. A router only has a single processor for transferring packet traffic and must route data traffic serially as compared to the parallel packet traffic provided by switches 50, 52 and 54.

The network switches 18 and 20 are designed to connect together a large number of devices at the same time. Therefore, the DASA is easily scaled to add any number of NASs 32 or routing engines 22 to the DASA 12. The interconnect switches 18 and 20 in one embodiment use LAN interfaces that are the common interface used by the different NASs 32 and routing engines 22. The LAN interfaces allow almost any commercially available NAS or router to be incorporated into DASA 12. The DASA 12 also allows the primary and secondary interconnects 18 and 20 to be easily upgraded with new switching technology that may provide more ports with faster LAN connections.

The primary and secondary interconnects 18 and 20 operate essentially as a multiplexer for the routing engines 22. For example, without the primary interconnect 18, the routing engines 22 would need one port for each NAS 32. The number of ports on the routing engines 22 would then limit the scalability of the DASA 12. However, the primary and secondary interconnects 18 and 20 effectively multiplex all the NASs 32 through a single router port. Thus, the routing engines 22 can support any number of NASs 32. The interconnects 18 and 20 also allow the NASs and routing engines 22 to be physically separated from each other. Thus, all the components in DASA 12 do not have to be located in the same chassis. This eliminates mechanical limitations, such as cooling requirements and box size, that could limit the scalability of the DASA 12.

Any protocol such as an Open Shortest Path First (OSPF) protocol can be used as the routing protocol that binds the whole DASA system 12 together. For example, an Enhanced Interior Gateway Routing Protocol (EIGRP), developed by Cisco Systems, Inc., selects the best path for packet forwarding based on bandwidth, delay and loading. Routing selection within the DASA 12 can be controlled by manipulating the delay and bandwidth of the different LAN connections. To select one path over the other, the bandwidth is set higher for that LAN interconnection to reduce delay. EIGRP routes data traffic over the higher bandwidth primary path under normal operation and over the secondary path in the event of failure in the primary path.

Multilink Sessions

Referring to FIG. 5, for multi-link calls, the NAS stack 16 is configured into a stack group using a Stack Group Bidding Protocol (SGBP). SGBP is a protocol that binds selectable NASs 32 in the NAS stack 16 into a single logical access server. Multi-link calls are then distributed across different chassis within the NAS stack 16. This arrangement encompasses all the multi-link functions, packet fragmentation and packet reassembly within the NAS stack 16. The SGBP is described in detail in co-pending patent application Ser. No. 08/846,788 entitled: DYNAMIC BIDDING PROTOCOL FOR CONDUCTING MULTILINK SESSIONS THROUGHOUT DIFFERENT PHYSICAL TERMINATION POINTS filed Apr. 30, 1997 which is herein incorporated by reference.

In a multi-link call, two streams of packet fragments can travel over two dial links 44 and 46. These links may be terminated by two different NASs 32A and 32B. The packet fragments from the dial links 44 and 46 must be reassembled before being forwarded to the routing engines 22. The NAS 32A that terminated the first call is configured by the SGBP to reassemble data streams from both dial links 44 and 46, while the NAS 32B that terminated the second link 44 forwards its data stream to the first NAS 32A. The reassembled stream 48 is then forwarded across one of the primary or secondary interconnect 18 or 20, respectively, avoiding packet fragment processing at the routing engines 22 or at the system controller 24.

In the SGBP, a pipe 42 is established between stack group members 32A and 32B. When a task or event occurs, such as establishment of communication links 44 and 46, the stack group members 32A and 32B conduct a bidding process. During the bidding process, each stack group member 32A and 32B bids for the event. The bidding process uses weighting criteria that varies dynamically depending on the computational status of the NASs 32 at the time the bidding is initiated. The value bid by each NAS 32 is weighted according to whether the NAS 32 is already controlling or processing similar events, network locality of the NAS 32 in relation to the event, CPU capacity of the NAS 32, current loading of the NAS 32, manual override values and an offload criteria that indicates the NAS 32 making the bid does not want to process the event. The event is allocated to the NAS 32 making the highest bid.

In one specific application, a multichassis multilink PPP (MLP) protocol utilizes SGBP to conduct multilink PPP sessions for links either originating or terminating on different physical systems. The SGBP establishes the different NASs 32, say NAS 32A and 32B, as stack group members that serve as termination points for an MLP bundle. The SGBP bidding scheme then establishes one of the NAS members, say NAS 32A as master of the MLP bundle. Upon receiving an incoming call upon which MLP has been negotiated, the stack group member 32B determines if a bundle already exists within the stack group where the link can be added. Since a bundle exists under the mastership of another stack group member 32A, the link is forwarded to that master as the "tunneled" link 42. The MLP protocol is well known to those skilled in the art, and is therefore, not described in further detail.

A L2F forwarding protocol is used in combination with multichassis MLP to forward the link 42 from NAS 32B to NAS 32A and offers location transparency. The L2F forwarding protocol is encapsulated around PPP sessions and then sent over a tunnel to the physical NAS 32A conducting the multilink session. The L2F forwarding protocol is described in co-pending patent application Ser. No. 08/687,973 entitled: "Virtual Dial-Up Protocol for Network Communications" filed Jul. 7, 1996 which is herein incorporated by reference.

Without primary or secondary interconnect 18 or 20, all NASs 32 would have to contend over the same network for communicating with each other and also with the routing engines 22. The primary and secondary interconnects 18 and 20 allow multiple pairs of NASs 32 to communicate to each other at the same time. Even more significant, the primary and secondary interconnects 18 and 20 allow anyone of the NASs 32 to communicate with the routing engines 22 while the other NASs 32 communicate with each other in parallel. This provides the substantial advantage of allowing the NASs 32 to perform the multilink PPP sessions independently of the data transfer process between the NAS stack 16 and routing engines 26. The transfer of information between the NAS stack 16 and the routing engines 22 is therefore more efficient, because the multilink packets have already been bundled together into one packet stream before being sent to routing engines 22.

System Controller

Referring back to FIG. 1, the system controller 24 manages and monitors the state of the dial network 14 and the individual components of the DASA stack 12. The controller 24 also serves as the primary NTP clock source for other members of the DASA stack 12. NTP is used to keep a consistent overall view of the entire DASA system 12 for keeping the time stamped log, error messages, accounting, authentication and authorization records synchronized. The system controller 24 is used as a terminal server for console access to all components in the DASA stack 12 and performs remote out-of-band management and diagnostics. The system controller 24 monitors the traffic through the DASA 12 while bypassing the routing engines 22. Without the system controller 24, the routing engines 22 would have to be used for communicating all management information to each one of the components in DASA 12. The system controller 24 through interconnects 21 access management and diagnostic data from the DASA components and combines the data together in local memory. The stored data is then sent via a bulk data transfer through modem 27 to the network management station.

For regulatory or technical reason, some telephone companies require separate network paths for network management traffic and for data payload traffic. The system controller 24 provides these separate network paths 21 for management traffic. The serial connection 25 is coupled to each NAS 32 in the NAS stack 16 for system debugging. The NAS stack 16 would typically not be accessible if the primary and secondary interconnects 18 and 20 both went down. The serial connection 25 provides a separate out of band link to NAS stack 16 for debugging the DASA system 12.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A dial access system, comprising:
multiple network access servers; and
a primary interconnect configurable to establish multiple parallel communication links with the network access servers, the multiple parallel links enabling parallel information transfer between multiple combinations of the multiple network access servers at the same time, the primary interconnect including at least one port coupled to a packet switched routing engine connecting different ones of the network access servers to the packet switched routing engine while in parallel connecting together different combinations of other network access servers.

2. A system according to claim 1 wherein the primary interconnect includes multiple parallel switching circuits configured to connect multiple pairs of the network access servers.

3. The system according to claim 1 including a secondary interconnect establishing multiple parallel secondary communication links with the network access servers, the multiple parallel secondary links also enabling parallel information transfer between the multiple combination of the multiple access servers at the same time while operating independently of the primary interconnect; and
wherein the secondary interconnect is coupled in parallel with the primary interconnect between the network access servers and the packet switched routing engine and also includes at least one port coupled to the routing engine for connecting different ones of the network access servers to the packet switched network through the packet switched routing engine while in parallel connecting together different other network access servers.

4. A system according to claim 1 including a buffer for storing packets transferred over the communication links.

5. A system according to claim 1 wherein the multiple network access servers include separate dial up ports for receiving circuit switched dial-up calls and secondary ports coupled to the primary interconnect.

6. A system according to claim 1 wherein the primary interconnect includes multiple Local Area Network (LAN) interfaces coupled to the network access servers.

7. A system according to claim 3 wherein the primary interconnect and secondary interconnect comprise separate Ethernet switches coupled between the multiple network access servers and the packet switched routing engine.

8. A method for connecting network processing devices together, comprising:
coupling the network processing devices together through a primary interconnect to a routing engine;
establishing multiple parallel connections in the primary interconnect between different pairs of the network processing devices and between the different network processing devices and the routing engine;
transferring information between the different pairs of network processing devices and between the different network processing devices and the routing engine through the multiple parallel connections established by the primary interconnect;
coupling the network processing devices together through a secondary interconnect to the routing engine, the secondary interconnect operating independently of the primary interconnect;
establishing multiple parallel connections in the secondary interconnect between different pairs of the network processing devices and between the different network processing devices and the routing engine; and
transferring information between the different pairs of network processing devices and between the different network processing devices and the routing engine through the multiple parallel connections established by the secondary interconnect.

9. A method according to claim 8 including establishing at least one of the parallel connections between one of the network processing devices and the routing engine and passing information between different pairs of the network processing devices while another one of the network processing devices in parallel transfers information with the routing engine.

10. A method according to claim 8 including:
monitoring call activity data for the network processing devices;
storing the monitored call activity data; and
configuring the primary interconnect according to the stored call activity data.

11. A method for connecting network processing devices together, comprising:
coupling the network processing devices together through a primary interconnect;
establishing multiple parallel connections in the primary interconnect between different pairs of the network processing devices;
transferring information between the different pairs of network processing devices through the multiple parallel connections established by the primary interconnect;
establishing members of a stack group from the multiple network processing devices;
establishing multiple links to the stack group members that operate together as a multilink bundle;
bidding from the stack group members for mastership of the multilink bundle;
assigning one of the stack group members making a highest bid as a bundle master;
forwarding data on the multiple links in the bundle to the bundle master; and
conducting a multilink session with the bundle master.

12. A method for connecting network processing devices together, comprising:
coupling the network processing devices together through a primary interconnect;
establishing multiple parallel connections in the primary interconnect between different pairs of the network processing devices;
transferring information between the different pairs of network processing devices through the multiple parallel connections established by the primary interconnect; establishing multiple links over a circuit switched network with the network processing devices;
extracting payload packet fragments from the multiple links with the network processing devices;
transferring the payload packet fragments between the network processing devices through the primary interconnect to a common one of the network processing devices;
assembling the payload packet fragments into one continuous packet stream with the common one of the network processing devices; and
sending the continuous packet stream from the common one of the network processing devices through the packet processing device to a packet-switched network.

13. A system for connecting network processing devices together, comprising:
means for coupling the network processing devices together through a primary interconnect to a routing engine;
means for establishing multiple parallel connections in the primary interconnect between different pairs of the network processing devices and between the different network processing devices and the routing engine;
means for transferring information between the different pairs of network processing devices and between the different network processing devices and the routing engine through the multiple parallel connections established by the primary interconnect;
means for coupling the network processing devices together through a secondary interconnect to the routing engine, the secondary interconnect operating independently of the primary interconnect;
means for establishing multiple parallel connections in the secondary interconnect between different pairs of the network processing devices and between the different network processing devices and the routing engine; and
means for transferring information between the different pairs of network processing devices and between the different network processing devices and the routing engine through the multiple parallel connections established by the secondary interconnect.

14. A system according to claim 13 including:
means for establishing at least one of the parallel connections between one of the network processing devices and the routing engine; and
means for passing information between different pairs of the network processing devices while another one of the network processing devices transfers information with the routing engine.

15. A system according to claim 13 including:
means for monitoring call activity data for the network processing devices;
means for storing the monitored call activity data; and
means for configuring the primary interconnect according to the stored call activity data.

16. A system for connecting network processing devices together, comprising:
means for coupling the network processing devices together through a primary interconnect;

means for establishing multiple parallel connections in the primary interconnect between different pairs of the network processing devices;

means for transferring information between the different pairs of network processing devices over the multiple parallel connections established by the primary interconnect;

means for establishing members of a stack group from the multiple network processing devices;

means for establishing multiple links to the stack group members that operate together as a multilink bundle;

means for bidding from the stack group members for mastership of the multilink bundle;

means for assigning one of the stack group members making a highest bid as a bundle master;

means for forwarding data on the links in the bundle to the bundle master; and means for conducting the multilink session with the bundle master.

17. A system for connecting network processing devices together, comprising:

means for coupling the network processing devices together through a primary interconnect;

means for establishing multiple parallel connections in the primary interconnect between different pairs of the network processing devices;

means for transferring information between the different pairs of network processing devices over the multiple parallel connections established by the primary interconnect;

means for establishing multiple links over a circuit switched network with the network processing devices;

means for extracting payload packet fragments from the multiple links with the network processing devices;

means for transferring the payload packet fragments between the network processing devices through the primary interconnect to a common one of the network processing devices;

means for assembling the payload packet fragments into one continuous packet stream with the common one of the network processing devices; and means for sending the continuous packet stream from the common one of the network processing devices through the packet processing device to a packet-switched network.

18. A computer readable medium having stored thereon computer-executable instructions that, when executed by a processor of a computer system to perform the following:

coupling the network processing devices together through a primary interconnect to a routing engine;

establishing multiple parallel connections in the primary interconnect between different pairs of the network processing devices and between the different network processing devices and the routing engine;

transferring information between the different pairs of network processing devices and between the different network processing devices and the routing engine through the multiple parallel connections established by the primary interconnect;

coupling the network processing devices together through a secondary interconnect to the routing engine, the secondary interconnect operating independently of the primary interconnect;

establishing multiple parallel connections in the secondary interconnect between different pairs of the network processing devices and between the different network processing devices and the routing engine; and transferring information between the different pairs of network processing devices and between the different network processing devices and the routing engine through the multiple parallel connections established by the secondary interconnect.

19. The computer readable medium of claim 18 including establishing at least one of the parallel connections between one of the network processing devices and the routing engine and passing information between different pairs of the network processing devices while another one of the network processing devices transfers information with the routing engine.

20. The computer readable medium of claim 18 including:

monitoring call activity data for the network processing devices;

storing the monitored call activity data; and configuring the primary interconnect according to the stored call activity data.

21. A computer readable medium having stored thereon computer-executable instructions that, when executed by a processor of a computer system to perform the following:

coupling network processing devices together through a primary interconnect;

establishing multiple parallel connections in the primary interconnect between different pairs of the network processing devices;

transferring information between the different pairs of network processing devices over the multiple parallel connections established by the primary interconnect;

establishing members of a stack group from the multiple network processing devices;

establishing multiple links to the stack group members that operate together as a multilink bundle;

bidding from the stack group members for mastership of the multilink bundle;

assigning one of the stack group members making a highest bid as a bundle master;

forwarding data on the links in the bundle to the bundle master; and conducting the multilink session with the bundle master.

22. A computer readable medium having stored thereon computer-executable instructions that, when executed by a processor of a computer system to perform the following:

coupling network processing devices together through a primary interconnect;

establishing multiple parallel connections in the primary interconnect between different pairs of the network processing devices;

transferring information between the different pairs of network processing devices over the multiple parallel connections established by the primary interconnect;

establishing multiple links over a circuit switched network with the network processing devices;

extracting payload packet fragments from the multiple links with the network processing devices;

transferring the payload packet fragments between the network processing devices through the primary interconnect to a common one of the network processing devices;

assembling the payload packet fragments into one continuous packet stream with the common one of the network processing devices; and sending the continuous packet stream from the common one of the network processing devices through the packet processing device to a packet-switched network.

23. An interconnect device, comprising:

a first interface including a first set of multiple ports for establishing a first set of independent communication links with multiple network processing devices; and first circuitry configurable to establish a first set of multiple parallel connections between the first set of communication links established with the network processing devices, the first set of multiple parallel connections enabling parallel information transfer between the network processing devices;

a second interface operating independently of the first interface including a second set of multiple ports for establishing a second set of independent communication links with the multiple network processing devices; and second circuitry operating independently of the first circuitry configurable to establish a second set of multiple parallel connections between the second set of communication links established with the network processing devices, the second set of multiple parallel connections providing parallel information transfer between the network processing devices independently of the first set of multiple parallel connections.

24. An interconnect according to claim 23 wherein the first and second circuitry includes multiple parallel switching circuits configured to connect multiple pairs of the communication links together in parallel.

25. An interconnect according to claim 23 wherein the first and second interface each include multiple ports coupled to network access servers and at least one port from both the first and second interface coupled to a routing engine, the first and second circuitry each connecting at least one of the network access servers to the routing engine while in parallel connecting together combinations of other network access servers.

26. An interconnect according to claim 23 including a buffer for storing packets transferred over the communication links.

27. An interconnect according to claim 23 wherein the ports comprise Local Area Network (LAN) ports.

* * * * *